J. LYDIATT.
Methods of Treating Glass-Molds.
No. 142,573.          Patented September 9, 1873.
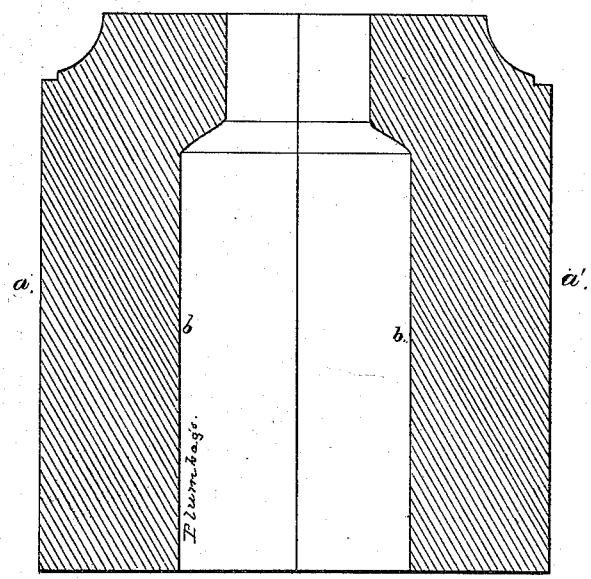
Witnesses.
Geo Gray
F. C. Hale.
James Lydiatt.
by his attorney
F. P. Hale

UNITED STATES PATENT OFFICE.

JAMES LYDIATT, OF MONTREAL, CANADA, ASSIGNOR TO NEW ENGLAND GLASS COMPANY, OF BOSTON, MASSACHUSETTS.

IMPROVEMENT IN THE METHODS OF TREATING GLASS-MOLDS.

Specification forming part of Letters Patent No. 142,573, dated September 9, 1873; application filed May 26, 1873.

*To all whom it may concern:*

Be it known that I, JAMES LYDIATT, of the city of Montreal, in the province of Quebec and Dominion of Canada, have invented a new and useful Improvement in Molds for Forming Glass Articles, of which the following is a specification:

It is a fact well known that, in forming many glass articles in an iron or metallic mold, great difficulty is experienced and much loss occasioned by the adhesion of the glass to the metal under the great heat to which the latter is subjected. In the production of the finer classes of glassware, or articles, by means of a mold, made in sections, it is desirable to avoid the formation of seams on the glass by the joints of the mold. To prevent this seaming of the articles molds have been made with a series of vertical rollers to revolve around the glass, while the latter was supported upon a stationary bed or bottom. Stationary molds have also been employed and the glass supported upon a rotary bed or bottom, the glass being caused to rotate against the surface of the mold. But in each of these cases more or less trouble has arisen from the friction or sticking of the glass to the mold. So also in molding many articles of glass by means of a press, such articles have so adhered to their molds as to render it a matter of annoyance and much difficulty to separate them from the mold without breakage. To avoid this difficulty various lubricants have been applied to the surface of the mold—to wit, resin, paraffine, bees-wax, and glycerine—but more or less objection exists to all of these, not only on account of the evanescent combustible character, but also on account of the deleterious effect upon the surface of the glass of the gaseous products evolved by their combustion.

The object of my invention is to remedy these evils and thereby enable seamless articles to be made in sectional molds with far greater facility, economy, and perfection of finish than heretofore attained, as well as to enable other articles pressed in a mold to be more readily separated therefrom; and my invention consists in an improvement in lubricating or surfacing the formation face of the mold, viz., by the application of one or more coatings of finely-powdered plumbago to the inner or working surface of the mold, or such parts thereof as are to be brought in contact with the glass, and subsequently imparting to such coated surface a high gloss or polish.

In carrying out my invention I take any desired amount of plumbago in a finely-powdered state, and, by preference, reduce the same to a thin pasty consistency by adding thereto water or any other suitable fluid. This paste I next apply to the inner or working surface of the mold with a soft brush or sponge, so as to fill the pores of the metal and form a coating thereon; and next, as soon as the coating has become dry, I rub the same with a hard brush until a brilliant gloss or polish has been attained. I would remark that the plumbago may be applied in a dry state, if desirable, and should a single coating not be sufficient to completely fill the pores of the iron and form a coating of the desired smoothness and polish, a second coating may be applied and treated as before stated.

My invention is applicable to all molds for forming glass. The plumbago, owing to its peculiar unctuous non-destructible character, when applied to a glass-forming mold and polished, as described, produces a most perfectly smooth anti-frictional surface of great utility and value for the purpose designed.

I do not claim, broadly, the application of a lubricant to the surface of a glass-mold, as I am aware that such is not new.

Having described my invention, what I claim as an improvement in molds for forming glass articles, is—

The application to the formative surface of a glass-forming mold of one or more coatings of plumbago, and subsequently treating such in the manner and for the purpose set forth.

JAMES LYDIATT.

Witnesses:
D. B. TIMLEY,
W. DeM. MARLER.